(12) United States Patent
Yamamoto et al.

(10) Patent No.: US 9,051,924 B2
(45) Date of Patent: Jun. 9, 2015

(54) ACTUATOR

(75) Inventors: Jun Yamamoto, Tokyo (JP); Tetsuo Hino, Yamato (JP); Sakae Suda, Yokohama (JP); Sotomitsu Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 517 days.

(21) Appl. No.: 13/510,855

(22) PCT Filed: Nov. 17, 2010

(86) PCT No.: PCT/JP2010/070954
§ 371 (c)(1),
(2), (4) Date: May 18, 2012

(87) PCT Pub. No.: WO2011/070912
PCT Pub. Date: Jun. 16, 2011

(65) Prior Publication Data
US 2012/0228999 A1 Sep. 13, 2012

(30) Foreign Application Priority Data

Dec. 8, 2009 (JP) .................................. 2009-278886

(51) Int. Cl.
*H01L 41/00* (2013.01)
*F03G 7/00* (2006.01)

(52) U.S. Cl.
CPC ....................................... *F03G 7/005* (2013.01)

(58) Field of Classification Search
USPC ................................................. 310/300, 800
See application file for complete search history.

(56) References Cited

U.S. PATENT DOCUMENTS

| | | | |
|---|---|---|---|
| 7,288,871 B1* | 10/2007 | Lu et al. | 310/300 |
| 7,315,106 B2 | 1/2008 | Asaka et al. | |
| 8,029,654 B2 | 10/2011 | Takagi et al. | |
| 2004/0006389 A1* | 1/2004 | Steenlage | 623/13.14 |
| 2012/0032553 A1* | 2/2012 | Goyal et al. | 310/300 |
| 2012/0161574 A1 | 6/2012 | Hino et al. | |
| 2012/0235543 A1* | 9/2012 | Suda et al. | 310/363 |

FOREIGN PATENT DOCUMENTS

| | | |
|---|---|---|
| JP | 2005-176428 A | 6/2005 |
| JP | 2007-244103 A | 9/2007 |
| JP | 2008-148452 A | 6/2008 |
| JP | 2008-266532 A | 11/2008 |
| JP | 2009-112100 A | 5/2009 |
| JP | 2009-278787 A | 11/2009 |

* cited by examiner

*Primary Examiner* — Thomas Dougherty
(74) *Attorney, Agent, or Firm* — Fitzpatrick, Cella, Harper & Scinto

(57) ABSTRACT

The present invention provides an actuator large in the amounts of displacement and generative force. The actuator includes a pair of electrode layers and an electrolyte-containing electrolyte layer interposed between the pair of electrode layers, and transforms upon application of a voltage thereto to cause ions in the electrolyte to migrate, wherein the electrolyte layer includes at least one polymer fiber layer made of polymer fibers and at least some of the polymer fibers of the polymer fiber layer are uniaxially oriented within a plane of the electrolyte layer.

4 Claims, 3 Drawing Sheets

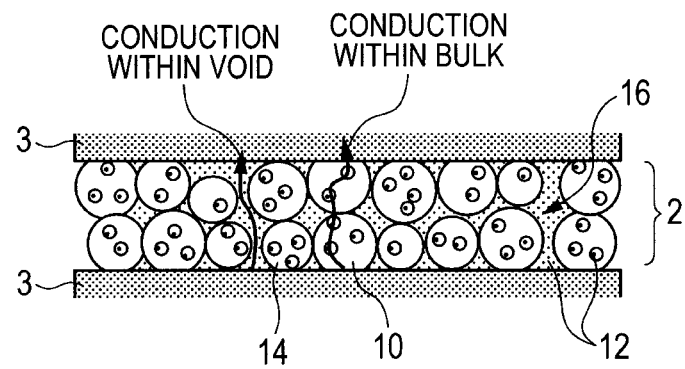
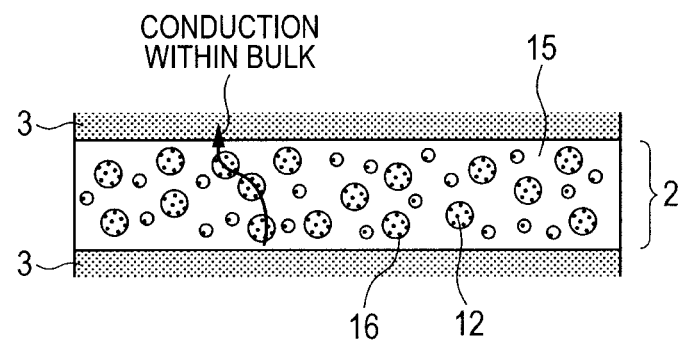

ACTUATOR

TECHNICAL FIELD

The present invention relates to an actuator, and specifically, to a polymer actuator including an electrolyte layer and electrode layers.

BACKGROUND ART

In various industrial fields, such as healthcare, welfare, robotics and electronics, there is a demand for a soft actuator having creature-like, flexible motional properties for reasons of compatibility with humans. Among other things, active research and development is being made on an actuator which uses a polymeric material and is caused to change in shape by an electrical stimulus, for reasons of controllability according to an electrical signal and possibility of being able to increase the amount of generative force per weight and volume.

The fundamental structure of these polymer actuators is such that an ionic substance is held between electronic conductors (electrodes). The actuators are known to make a bending motion and/or a stretching motion as devices, in response to voltage application across the electrodes, due to a volumetric change, an electrostatic repulsive force or the like resulting from interelectrode attractive force or ionic migration.

In particular, an actuator using a gelatinous material including carbon nanotubes (CNTs) and an ionic liquid which is a nonvolatile ion-conducting material operates at a voltage as low as several volts. In addition, the actuator is known to have excellent properties, such as exhibiting extremely high stability in the air and in a vacuum (Japanese Patent Application Laid-Open No. 2005-176428).

The above-described actuator has a configuration in which an electrolyte layer formed by gelling an ionic liquid and a polymer is held between electrode layers formed of CNTs, an ionic liquid and a polymer.

In the conventional example described in the above-mentioned Patent Document 1, however, an electrolyte layer and electrode layers are filmy membranes fabricated by a casting method or the like. Accordingly, the mobility of ions within the actuator cannot be said to be sufficiently high. Since a low efficiency of ionic migration may lead to a reduction in displacement or generative force required of an actuator, there has been the need to cope with these problems.

In addition, use of such a filmy membrane makes it difficult to arbitrarily design the balance of the actuator between the displacement and generative force thereof by methods other than changing a membrane thickness.

CITATION LIST

Patent Literature

PTL 1: Japanese Patent Application Laid-Open No. 2005-176428

SUMMARY OF INVENTION

Technical Problem

The present invention has been accomplished in view of such a background art as described above and is directed at providing an actuator large in the amounts of displacement and generative force.

Solution to Problem

The actuator provided in order to solve the above-described problems includes a pair of electrode layers and an electrolyte-containing electrolyte layer interposed between the pair of electrode layers, and transforms upon application of a voltage thereto to cause ions in the electrolyte to migrate, wherein the electrolyte layer includes at least one polymer fiber layer made of polymer fibers and at least some of the polymer fibers of the polymer fiber layer are uniaxially oriented within a plane of the electrolyte layer.

Advantageous Effects of Invention

According to the present invention, it is possible to provide an actuator large in the amounts of displacement and generative force.

Further features of the present invention will become apparent from the following description of exemplary embodiments with reference to the attached drawings.

BRIEF DESCRIPTION OF DRAWINGS

FIG. 3 is a schematic view used to describe a configuration of an electrolyte layer and the conduction of an ionic substance in the present invention.

FIG. 4 is a schematic view used to describe a configuration of an electrolyte layer and the conduction of an ionic substance in the prior art.

DESCRIPTION OF EMBODIMENTS

Hereinafter, the present invention will be described in detail. An actuator according to the present invention includes a pair of electrode layers and an electrolyte-containing electrolyte layer interposed between the pair of electrode layers, and transforms upon application of a voltage thereto to cause ions in the electrolyte to migrate, wherein the electrolyte layer includes at least one polymer fiber layer made of polymer fibers and at least some of the polymer fibers of the polymer fiber layer are uniaxially oriented within a plane of the electrolyte layer.

Figure 1:
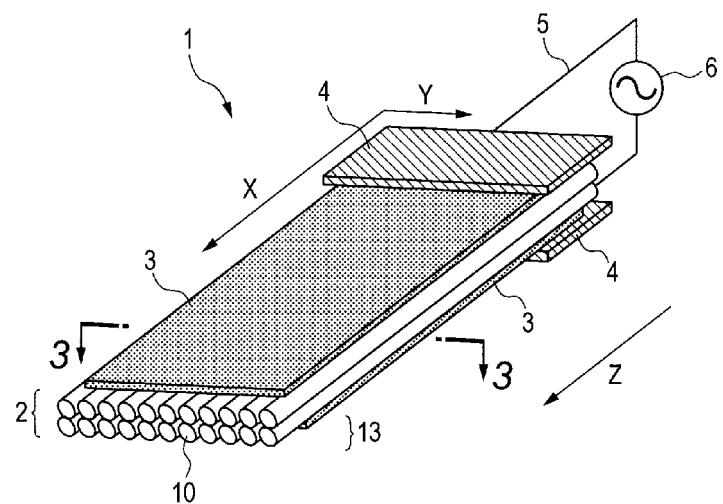
FIG. 1 is a bird's-eye view used to describe a configuration of one embodiment of an actuator of the present invention.

Hereinafter, embodiments of the actuator in the present invention will be described. FIG. 1 is an illustration to describe the configuration of one embodiment of an actuator of the present invention. In FIG. 1, an actuator 1 includes an electrolyte layer 2, an electrode layer 3, an extraction electrodes 4, a lead wire 5, a driving power supply 6, a polymer fiber layer 13, and polymer fibers 10 of the electrolyte layer, wherein the symbol Z represents a direction in which the polymer fibers are uniaxially oriented (abbreviated as a "uniaxial orientation direction").

The actuator 1 of the present invention is characterized in that the actuator 1 includes a pair of electrode layers 3 and the electrolyte-containing electrolyte layer 2 interposed between the pair of electrode layers, and transforms upon application of a voltage thereto to cause ions in the electrolyte to migrate, wherein the electrolyte layer 2 includes the polymer fiber layer 13 made of an aggregate of polymer fibers 10 and has portions in which the polymer fibers 10 of the polymer fiber layer 13 are regularly oriented in a uniaxial direction within an plane of the electrolyte layer 2.

FIGS. 3 and 4 are schematic views used to describe differences in configuration and in the conduction of an ionic substance between an electrolyte layer in an embodiment of the present invention (FIG. 3) and an electrolyte layer in the prior art (FIG. 4). FIG. 3 represents a cross-sectional view taken along the line 3-3 of FIG. 1.

As illustrated in FIG. 3, in a fiber-like film the polymer fibers of which are arranged so as to be uniaxially oriented (abbreviated as "uniaxial orientation"), the polymer fibers themselves contain the ionic substance 12 therein. In addition, the film has a configuration in which bulks 14 of the polymer fibers continue. Accordingly, at least partial voids 16 structurally exist among polymer fibers. The ionic substance 12 also passes through voids present among bulks of the polymer, in addition to conduction paths present in the bulks. Since the pore diameter of each void is larger than ion conduction paths within the bulks, the ionic conductivity of the void is also more great.

On the other hand, a filmy electrolyte layer of the conventional art illustrated in FIG. 4 and formed by, for example, a casting method also retains an ionic substance 12 within the polymer thereof. Also, partial voids 16 can also exist in the electrolyte layer. However, the electrolyte layer as a whole is formed of a single bulk structure, and therefore, has fewer voids 16 present among bulks 15, compared with a fiber-like film. Accordingly, an electrolyte layer using polymer fibers is higher in the ratio of voids existing within a film than the conventional electrolyte layer.

For this reason, it is possible to more enhance the efficiency of ion migration within the electrolyte layer by using such a polymer fiber layer (fiber-like film) made of polymer fibers as discussed in the present invention for the electrolyte layer than by using a filmy electrolyte layer of the prior art formed by, for example, a casting method. Consequently, it is possible to further improve the displacement or generative force of an actuator.

In addition, adopting the configuration of the electrolyte layer of an embodiment of the present invention allows the electrolyte layer to have a structure high in mechanical strength against bending in the axial direction of uniaxial orientation and easy to derive a force therefrom as a film. On the other hand, the structure is relatively low in mechanical strength against bending in a direction perpendicular to the axis of the electrolyte layer and is, therefore, easy to facilitate displacement as a film. Consequently, the configuration of the present invention enables the mechanical strength against bending to be arbitrarily adjusted according to an orientation direction. Thus, the displacement or generative force required of an actuator can be improved further.

Hereinafter, respective materials and the configuration of an actuator will be described in further detail.

Actuator Configuration

An actuator 1 contains an electrolyte and takes transformative action according to the migration of ions within an electrolyte. An electrode layer 3 containing an electroconductive material, an electrolyte and a polymer are formed on both surfaces of an electrolyte layer 2 containing the electrolyte and polymer fibers. Each layer has flexibility and is formed into a rectangular shape. The actuator is preferably a polymer actuator.

Figure 2A:
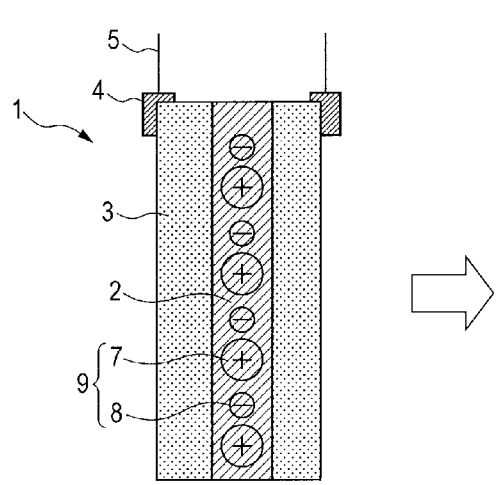
FIG. 2A is a schematic view used to describe the action of one embodiment of an actuator of the present invention.
Figure 2B:
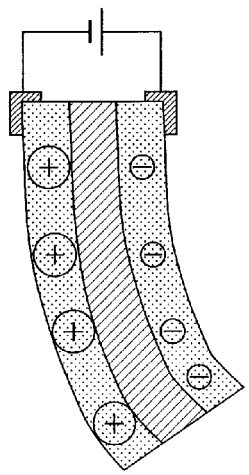
FIG. 2B is a schematic view used to describe the action of one embodiment of an actuator of the present invention.

As illustrated in FIG. 1, in a structure in which the two electrode layers are sandwiched so as to face each other, the actuator as a whole exhibits such bending action as illustrated in FIGS. 2A and 2B, in response to voltage application. If one longitudinal-direction end of the actuator is fixed by the extraction electrode 4, the actuator bends so as to warp away from the longitudinal direction. By designing the configuration of the electrolyte layer 2 and the arrangement of the electrode layers 3, the actuator can be made to exhibit stretching action and/or twisting action, in addition to bending action.

Furthermore, in addition to a rectangular plate-like form, the form of the actuator 1 can be arbitrarily selected from the group consisting of a tabular form in the shape of, for example, a circle, a triangle, an ellipse or a rod, a membranal form, a cylindrical form, a spiral form, and a coil-like form. Yet furthermore, the actuator 1 can also have a composite configuration including one element or a plurality of elements.

Electrolyte Layer Configuration

The electrolyte layer 2 includes at least one polymer fiber layer 13 made of polymer fibers. At least some of polymer fibers 10 of the polymer fiber layer are uniaxially oriented within a plane thereof. Here, the one polymer fiber layer refers to a film body formed by aggregating polymer fibers. The electrolyte layer may be formed into a multilayer structure by arbitrarily laminating these film bodies. If polymer fiber layers obviously different in structure are stacked in the thickness direction thereof in one film body, then the electrolyte layer may be considered as being multilayer. Uniaxially oriented and uniformly arranged polymer fibers may only be partial within a plane of the electrolyte layer. Alternatively, the electrolyte layer may include a plurality of polymer fibers having different uniaxial directions.

In a filmy polymer fiber layer (fiber-like film) in which polymer fibers 10 are arranged so as to be uniaxially oriented, at least voids are created among the polymer fibers. Owing to these voids, portions inside and outside bulks of the polymer fibers serve as ion conduction paths, thereby allowing ions to migrate and diffuse more easily. Thus, the efficiency of ion migration within the actuator can be enhanced. Consequently, the characteristics of the actuator can be improved.

In addition, a fiber-like film in which polymer fibers 10 are arranged so as to be uniaxially oriented has a structure high in mechanical strength against bending in the axial direction and easy to derive a force therefrom as a film. On the other hand, the structure is relatively low in mechanical strength against bending in a direction perpendicular to the axis of the electrolyte layer and is, therefore, easy to facilitate displacement as a film.

Consequently, the mechanical strength against bending can be arbitrarily adjusted according to an orientation direction. Thus, the displacement or generative force required of an actuator can be improved further.

If all of the directions of uniaxial orientation are the same, the displacement or generative force can be improved further. Specifically, if the polymer fibers of the electrolyte layer are uniformly aligned in the longitudinal direction (X direction) of a polymer actuator, mechanical strength in a bending direction can be increased. Accordingly, the polymer actuator is less likely to yield by interaction with a target object upon which the actuator is to exert a force. Thus, the polymer actuator can transfer an even greater force to the target object.

In addition, if the polymer fibers of the electrolyte layer are uniformly aligned in the transverse direction (Y direction) of the polymer actuator, mechanical strength in the bending direction can be decreased. Accordingly, the displacement of the polymer actuator in the bending action thereof can be further facilitated.

Furthermore, the polymer actuator can be designed so that the polymer fibers of the electrolyte layer are oriented at an arbitrary angle from the longitudinal direction. Consequently, the displacement or generative force of the polymer actuator can be adjusted by the degree of inclination.

Yet furthermore, the polymer fiber layer of the electrolyte layer may be multilayer. In this case, orientation directions among different layers may be either the same or different. For example, the mechanical strength of the polymer actuator can be increased further by adopting a net-like structure in which at least one layer is oriented in the longitudinal direction and at least one of other layers is oriented in the transverse direction.

Each polymer fiber is sufficiently long with respect to the diameter thereof. As the diameter, a value of 0.05 μm or more and 50 μm or less can be applied. Since the amount of fill per volume can be adjusted more flexibly with decreasing fiber diameter, the diameter is more preferably 0.05 μm or more and 1 μm or less.

The thickness of the electrolyte layer containing these polymer fibers is preferably 1 μm or more and 500 μm or less. One reason for this is that the electrolyte layer needs to be 1 μm or more in film thickness, in order to retain a sufficient amount of electrolyte. Another reason for this is that the electrolyte layer needs to be controlled to 500 μm or less in film thickness since operating efficiency degrades if the electrolyte layer is thickened to increase mechanical strength against bending to too high a degree.

In addition, the polymer fibers may retain an ionic liquid therein. Alternatively, the polymer fibers may retain the ionic liquid in voids among the polymer fibers. The cross-sectional shape of each polymer fiber is not limited in particular, but may be circular, elliptical, quadrangular, polygonal, semicircular, or the like. Furthermore, the cross-sectional shape may not be a precise shape, and the polymer fibers may be different in shape at any cross section thereof. Note that the fiber diameter refers to the diameter of a circle in cross-sectional view for cylindrical polymer fibers. In any other cases, the fiber diameter refers to the length of the longest straight line through the center of gravity in the fiber cross section.

Electrode Layer Configuration

The configuration of each electrode layer 3 is not limited in particular. Examples of the electrode layer 3 include a filmy membrane containing an electroconductive material, an electrolyte and a polymer formed by, for example, a casting method. Alternatively, the electrode layer 3 may be a thin metal layer formed by means of plating, sputtering or vapor deposition.

The thickness of these filmy membranes is preferably 0.1 μm or more and 5 mm or less, and more preferably 1 μm or more and 500 μm or less. Each membrane needs to be 0.1 μm or larger in thickness, in order to secure an adequate amount of electrolyte to migrate within each electrode layer. The membrane needs to be controlled to 5 mm or smaller in film thickness, however, since operating efficiency degrades if the electrolyte layer is thickened to excessively increase mechanical strength against bending.

Like the electrolyte layer 2, each electrode layer 3 may be configured so as to include a polymer fiber layer made of at least one layer and have portions in which the polymer fibers of the polymer fiber layer are aligned in a uniaxial direction within a plane of the electrode layer. Here, the one polymer fiber layer refers to a film body formed by aggregating polymer fibers. The electrolyte layer may be formed into a multilayer structure by arbitrarily laminating these film bodies. If polymer fiber layers obviously different in structure are stacked in the thickness direction thereof in one film body, then the electrode layer may be considered as being multilayer. In this case, the electroconductive material may be located at any place inside or outside the polymer fibers. That is, an electroconductive member made of metal, carbons or the like may be provided on surfaces of the polymer fibers. Alternatively, these electroconductive members may be provided inside the polymer fibers.

Specifically, it is preferable that either one of the pair of electrode layers includes at least one polymer fiber layer made of an electroconductive material and polymer fibers, and at least some of the polymer fibers of the electrode layer are uniaxially oriented within a plane thereof.

In addition, both of the directions in which the polymer fibers of the electrolyte layer and the polymer fibers of each electrode layer are uniaxially oriented are preferably the longitudinal direction of the actuator. Alternatively, both of the directions in which the polymer fibers of the electrolyte layer and the polymer fibers of each electrode layer are uniaxially oriented are preferably the transverse direction of the actuator.

The configuration of the electrode layer's polymer fiber layer made of the polymer fibers is the same as the configuration of the polymer fiber layer of the electrolyte layer. The orientation direction of the polymer fibers of the electrode layer 3 can be arbitrarily designed. It is preferable, however to provide a correlation between the orientation direction of the electrode layer 3 and that of the electrolyte layer 2.

For example, in a case where the polymer fibers of the electrolyte layer 2 are oriented in the longitudinal direction, mechanical strength within a plane of the actuator can be increased if the polymer fibers of the electrode layer 3 are oriented in the transverse direction.

A more preferred configuration is that (1) the polymer fibers of the electrode layer 3 are allowed to orient in the longitudinal direction in a case where the polymer fibers of the electrolyte layer 2 are oriented in the longitudinal direction, or that (2) the polymer fibers of the electrode layer 3 are allowed to orient in the transverse direction in a case where the polymer fibers of the electrolyte layer 2 are oriented in the transverse direction.

In the configuration described in item (1), mechanical strength against the bending direction of the polymer actuator can be increased further. Accordingly, the polymer actuator is less likely to yield by interaction with a target object upon which the actuator is to exert a force. Thus, the polymer actuator can transfer an even greater force to the target object.

In addition, in the configuration described in item (2), mechanical strength in the bending direction of the polymer actuator can be decreased further. Accordingly, displacement of the polymer actuator in the bending action thereof can be further facilitated.

Furthermore, the polymer actuator can be designed so that the polymer fibers of the electrode layer are oriented at an arbitrary angle with respect the orientation of the polymer fibers of the electrolyte layer. Consequently, the displacement or generative force of the polymer actuator can be adjusted by the degree of inclination.

Yet furthermore, the polymer fiber layer of the electrode layer may be multilayer. In this case, orientation directions among different layers may be either the same or different. For example, the mechanical strength of the polymer actuator can be increased further by adopting a net-like structure in which at least one layer is oriented in the longitudinal direction and at least one of other layers is oriented in the transverse direction.

These polymer fibers are sufficiently long with respect to the diameter thereof. As the diameter, 0.05 μm or more and 50 μm or less can be applied. Since the amount of filling per volume can be adjusted more flexibly with decreasing fiber diameter, the diameter is more preferably 0.05 µm or more and 1 µm or less.

Like a filmy electrode layer, the electrode layer containing these polymer fibers is preferably 0.1 µm or more and 5 mm or less in thickness. In addition, the cross-sectional shape of each polymer fiber is not limited in particular, but may be circular, elliptical, quadrangular, polygonal, semicircular or the like. Furthermore, the cross-sectional shape may not be an exact shape, and the polymer fibers may be different in shape at any cross section thereof. Note that the fiber diameter refers to the diameter of a circle in cross-sectional view for cylindrical polymer fibers. In any other cases, the fiber diameter refers to the length of the longest straight line through the center of gravity in a fiber cross section.

Constituent Materials of Actuator

Typical materials will be described with regard to members for constituting the actuator 1.

Electrolyte Layer

The electrolyte layer 2 is a flexible material including an electrolyte (i.e., a substance exhibiting ionicity in a molten state) and a polymer. That is, the electrolyte layer 2 is a nonionic high-molecular compound containing an ionic substance, or an ion-conducting high-molecular compound. In these materials, ions serve as charge carriers when charges migrate and therefore electric current flows under electric field.

Examples of the polymer may include a fluorine-containing polymer such as tetrafluoroethylene and polyvinylidene fluoride; a polyolefin-based polymer such as polyethylene and polypropylene; a polybutadiene-based compound; a polyurethane-based compound such as elastomer and gel; a silicone-based compound; thermoplastic polystyrene; polyvinyl chloride; and polyethylene terephthalate. These polymers may be used either singularly or in combination, may be functionalized, or may be copolymerized with other polymers.

Examples of an ionic substance to be contained in any of these polymers may include lithium fluoride, lithium bromide, sodium bromide, magnesium chloride, copper sulfate, sodium acetate, sodium oleate, and sodium acetate. The ionic substance preferably includes tetrafluoroboric acid ion, hexafluorophosphoric acid ion, trifluoromethanesulfonic acid ion, ion of bis(trifluoromethylsulfonyl)imide or tris(trifluoromethylsulfonyl)imide, ion of bis(trifluoromethylsulfonyl)methide or tris(trifluoromethylsulfonyl)methide, or salts of these ions. As a counter ion of these ions, lithium, sodium, or the like is used.

In addition, use of an ionic liquid as the ionic substance is more preferable since durability against driving in the air is improved. Here, the ionic liquid is referred to as, for example, an ambient temperature molten salt or simply as a molten salt. This salt exhibits a molten state over a wide range of temperature including normal temperature (room temperature). That is, the salt exhibits a molten state at, for example, 0° C., preferably at −20° C., and more preferably at −40° C. In addition, the ionic liquid is preferably high in ion conduction.

Various types of heretofore-known ionic substances can be used for the ionic liquid. It is preferable, however, to use a stable ionic substance which exhibits a liquid state over a temperature range in which the substance is used. Examples of preferred ionic liquids include imidazolium salt, pyridinium salt, ammonium salt, and phosphonium salt. These salts may be used either singularly or in combination.

An electrolyte layer in which an ionic liquid is used for the electrolyte and a polyvinylidene fluoride-hexafluoropropylene copolymer [PVDF (HFP)] or polyvinylidene fluoride (PVDF) is used as the polymer is preferred as the electrolyte layer of the present invention.

Electrode Layer

The electrode layer 3 includes a flexible electrode made of a composite body of an electroconductive material and a polymer, or includes a flexible thin-layer electrode made of an electroconductive material.

The electroconductive material may be of any type as long as the material has no adverse effects on actuator performance. Examples of the electroconductive material include various carbon materials, such as graphite, carbon black, acetylene black, ketjen black, carbon whiskers, carbon fibers, carbon nanotubes, carbon micro-coils, powders (fine particles) made of metal (gold, platinum, palladium, ruthenium, silver, iron, cobalt, nickel, copper, indium, iridium, titanium, aluminum, and the like), metal compounds (tin oxide, zinc oxide, indium oxide, stannic oxide, ITO, and the like), metal fibers, electroconductive ceramic materials, and electroconductive polymer materials. Each electrode layer contains one of these electroconductive materials or a mixture thereof.

As the electroconductive material, a carbon material having a nanostructure is preferred from the viewpoint of conductive properties and specific surface areas. Particularly preferably, the electroconductive material is a carbon nanotube (CNT). In addition, a CNT gel made of carbon nanotubes and an ionic liquid is advantageous in that, for example, a bundle of CNTs is turned into a gel due to self-assembly with the ionic liquid, so that the CNTs are effectively dispersed. Thus, the carbon material is extremely preferable as the electrode material.

The polymer contained in the electrode layer 3 is not limited in particular, as long as the polymer has such flexibility that it can follow the action of the actuator. Preferably, however, the polymer is less hydrolyzable and is stable in the air. Examples of such a polymer may include polyolefin-based polymers such as polyethylene and polypropylene; polystyrene; polyimide; polyarylenes (aromatic polymers) such as polyparaphenylene oxide, poly(2,6-dimethylphenylene oxide) and polyparaphenylene sulfide; polymers in which a sulfonate group (—SO3H), a carboxyl group (—COOH), a phosphate group, a sulfonium group, an ammonium group, a pyridinium group or the like is introduced into a polyolefin-based polymer, polystyrene, polyimide, polyarylenes (aromatic polymers) or the like; fluorine-containing polymers such as polytetrafluoroethylene and polyvinylidene fluoride; perfluorosulfonic acid polymers, perfluorocarboxylic acid polymers, perfluorophosphoric acid polymers and the like in which a sulfonate group, a carboxyl group, a phosphate group, a sulfonium group, an ammonium group, a pyridinium group or the like is introduced into the skeleton of a fluorine-containing polymer; polybutadiene-based compounds; polyurethane-based compounds such as elastomer and gel; silicone-based compounds; polyvinyl chloride; polyethylene terephthalate; nylon; and polyarylate.

A polymer having conductivity can also be used, and such a polymer is not limited in particular. Examples of the polymer may include polyaniline, polypyrrole, polythiophene, polyacetylene and polyphenylene. These polymers may be used either singularly or in combination, may be functionalized, or may be copolymerized with other polymers.

The abovementioned polymer is preferably high in compatibility with the electrolyte layer 2. The polymer's high compatibility with and bondability to the electrolyte layer 2 enables configuration of a strongly adhered electrode layer 3. For this reason, the polymer preferably has a polymeric structure, or a functional group, of the same type as, similar to, or identical to that of a high-molecular compound constituting the electrolyte layer 2.

The electrode layer 3 may be formed as a layer composed of only metal. When such an electrode is formed directly on the electrolyte layer, the electrode can be regarded as being formed only of an electroconductive material. This metal layer may be formed of such a metal as gold, platinum, palladium, ruthenium, silver, iron, cobalt, nickel, copper, indium, iridium, titanium, aluminum, and the like. This layer may be formed as a thin metal layer with plating, vapor deposition, sputtering, or the like. Two electrode layers 3 that sandwich the electrolyte layer 2 may be formed of the same material or different materials among the above-listed materials.

The electrode layer 3 may be formed as a thin metal layer by means of plating, vapor deposition or sputtering. If such an electrode is directly formed on the electrolyte layer, the electrode layer 3 may be regarded as being formed only of an electroconductive material.

Method for Manufacturing Actuator

A typical manufacturing method will be described with regard to the configuration of an actuator.

Method for Manufacturing Electrolyte Layer

The electrolyte layer of the present invention is characterized by including a polymer fiber layer made of at least one layer and having portions in which polymer fibers of the polymer fiber layer are aligned in a uniaxial direction within a plane of the electrolyte layer.

A method for fabricating the polymer fibers of the present invention is not limited in particular. However, examples of the method may include an electrospinning method, a composite spinning method, a polymer blend spinning method, a melt-blow spinning method, and a flash spinning method.

Of these methods, the electrospinning method is preferably used for the reason that this method allows various polymers to be spun into fiber form, the fiber form is controlled comparatively simply and easily, and thereby nanosized fibers can be obtained.

A method for manufacturing polymer fibers by an electrospinning method is carried out using a high-voltage power supply, a polymer solution, a polymer solution storage tank, a spinning nozzle, and a grounded collector. The polymer solution is extruded at a constant rate from the tank to the spinning nozzle. A voltage of 1 to 50 kV is applied to the spinning nozzle. When an electrical attraction force exceeds the surface tension of the polymer solution, a jet of the polymer solution is sprayed toward the collector. At this time, a solvent in the jet gradually volatilizes, and the size of the jet reduces to a nanometric level by the time the jet reaches the collector. Thus, an electrolyte layer is formed at the collector.

The polymer fiber layer has portions in which polymer fibers are aligned in a uniaxial direction within a plane of the electrolyte layer. A method for orienting the polymer fibers is not limited in particular, but heretofore-known techniques can be used as appropriate, or in combination in some cases. In the above-mentioned electrospinning method, for example, a fiber is continuously spun while being taken up using a rotating drum capable of taking up fibers as the collector. Thus, it is possible to fabricate polymer fibers uniaxially orientated within the plane. The degree of uniaxial orientation and the fiber diameter of polymer fibers can be controlled by adjusting the take-up rate of the rotating drum. For example, the degree of orientation tends to improve and the fiber diameter tends to decrease with an increase in the take-up rate.

The electrolyte layer formed of these polymer fibers has portions in which the polymer fibers are aligned in a uniaxial direction within a plane of the electrolyte layer. The polymer fibers aligning in the uniaxial direction may only be partial or the polymer fibers may be formed of a plurality of polymer fiber groups having different uniaxial directions within the plane of the electrolyte layer. An electrolyte layer in which all of polymer fibers have the same uniaxial direction allows further improvement in the displacement or generative force of the actuator and is, therefore, more preferable.

The ratio of polymer fibers being aligned in a uniaxial direction within a plane of the electrolyte layer is calculated as a degree of orientation by analyzing images observed using a scanning electron microscope (SEM) by the analysis command "Directional Distribution Measurement" of the image processing software ("A-Zo-Kun" made by Asahi Kasei Engineering Corporation). Specifically, the obtained inclinations of fibers is divided into 18 equal subdivisions in increments of 10° over a range from 0° to 180°. Then, a frequency distribution graph representing the number of fibers (frequency) within the range of each subdivision is drawn to determine the ratio by the following equation.

$$\text{Degree of orientation (\%)} = (\text{Number of subdivisions having frequency one-half or less the maximum frequency})/(\text{Total number of subdivisions}) \times 100 \quad \text{Math. 1}$$

The ratio at which polymer fibers are aligned in a uniaxial direction becomes higher with increasing degree of orientation. A preferred degree of orientation of an electrolyte layer in the present invention is 50% or higher. More preferably, the degree of orientation is 80% or higher.

Method for Manufacturing Electrode Layer

There is no particular limitation on a method for manufacturing the electrode layer 3 used in the present invention. Now assume, as an example, the case in which each electrode layer 3 is formed of an electroconductive material, an ionic liquid and a polymer. In this case, various heretofore-known methods may be used, including mechanically kneading the ionic liquid and the polymer under heating and then forming the electrode layer, or dissolving the ionic liquid and the polymer in a proper solvent and then removing the solvent and forming the electrode layer.

As the solvent used in the above-described method of dissolving the ionic liquid and the polymer in a proper solvent and then removing the solvent, it is possible to use any one of, for example, tetrahydrofuran (THF), methyl ethyl ketone, N-methyl-2-pyrrolidone, and dimethylacetamide (DMAc).

Like the electrolyte layer 2, the electrode layer 3 may be formed of polymer fibers. As a method for fabricating an electrode layer formed of polymer fibers, an electroconductive material may be added to the above-described process of fabricating polymer fibers of the electrolyte layer 2 and the same technique as used in the above-described method of electrolyte layer fabrication may be used.

Bonding of Electrolyte Layer and Electrode Layer

The obtained electrolyte layer 2 and electrode layer 3 are cut into an arbitrary shape and size. A method for forming a polymer actuator 1 is not limited in particular. It is possible, however, to suitably use a method in which the electrode layer 3 is disposed on both surfaces of the electrolyte layer 2 so as to hold the electrolyte layer therebetween and hot-pressed.

The temperature, pressure and time of hot pressing are not limited in particular, as long as the temperature is not higher than the decomposition temperature of a high-molecular binder. The temperature, pressure and time may be selected as appropriate, according to the high-molecular binder to be used, a high-molecular compound for constituting the actuator, the species of migrating ions, and the like. The hot-press temperature is preferably, for example, 30° C. to 150° C. In addition, the press pressure is preferably 1 to 100 kg/cm$^2$, and more preferably 10 to 50 kg/cm$^2$.

Alternatively, a method may be used in which metal layers are thinly formed on surfaces of the electrolyte layer 2 by means of plating, vapor deposition, sputtering, or the like. In order to make the actuator contain water, an ionic substance, an ionic liquid, or a mixture thereof after device fabrication, the actuator may be impregnated with one of these solutions. Here, the concentration of the solution to impregnate with and the time of impregnation are not limited in particular, but a heretofore-known method may be used.

By arbitrarily designing the uniaxial orientation directions of polymer fibers for forming the electrolyte layer 2 and the electrode layer 3 at the time of bonding, it is possible to take such a configuration that the displacement or generative force of the actuator is improved further.

Fixation of Actuator and Connection Thereof to Driving Power Supply Section

The actuator 1 of the present invention is fixed and connected to a driving power supply 6 by using an extraction electrode 4 and a lead wire 5.

A pair of electrode layers is connected to a pair of extraction electrodes. The extraction electrode 4 is disposed so as to sandwich at least part of each electrode layer 3 of the actuator at the film surface thereof. The actuator 1 is fixed and supported by an applied pressure to sandwich it. In order to maintain pressures on these elements, there is used one of methods for fastening the pair of extraction electrodes 4 facing each other with bolts, tightening the extraction electrodes 4 with a string-like substance, clamping the extraction electrodes 4 by a spring-driven biasing force like that of a clip, and pressure-bonding the extraction electrodes 4 with an adhesive agent or the like. The extraction electrodes 4 may abut on the electrolyte layer 2, in addition to the electrode layer of the actuator.

The extraction electrodes 4 are preferably formed of a highly-rigid member for the sake of secure fixation. Specifically, a metal material such as one of gold, silver, copper, platinum, SUS, and aluminum can be used. Alternatively, a fixing material, such as a glass material, a ceramic material or a plastic material, and an electroconductive material can be used in combination.

The actuator 1, when held by the extraction electrode 4 therebetween, is fixed at the motional basis point of the actuator, and is connected to the driving power supply 6. The driving power supply 6 is an apparatus for applying a voltage or an electric current to the actuator 1. With this electrical input, the actuator 1 changes in shape and, as a whole, exhibits bending action, as illustrated in FIGS. 2A and 2B.

Driving of Actuator

The driving power supply 6 applies a voltage or an electric current across the electrode layers of the actuator 1, thereby providing a potential difference between the electrode layers. The input value, input duration, input polarity, input waveform and the like of this electrical signal is controlled by an unillustrated control apparatus, thereby enabling the bending action of the actuator to be controlled.

In the actuator having an electrode layer/electrolyte layer/electrode layer structure, a volumetric change takes place between the two electrode layers due to the intralayer migration of an ionic substance resulting from the potential difference. For example, anions and cations composing the ionic liquid are attracted to a positive pole and a negative pole, respectively, upon voltage application if the actuator contains an ionic liquid. In general, these anions and cations contained in the ionic liquid differ in size, thus contributing to giving rise to a volumetric difference between the electrode layers.

In association with such a shape or volumetric change between the electrode layers, the actuator as a whole exhibits such bending action as bending toward one electrode side. In addition, the migration distance and speed of the ionic substance vary depending on the value of a voltage or an electric current applied across the two electrodes. Accordingly, the amount and rate of displacement in the bending motion of the actuator can be controlled by means of electrical control. By changing the polarity of the voltage or the direction of the electric current to be applied, it is possible to control the direction of bending motion.

The driving power supply 6 applies a DC voltage (current) or an AC voltage (current) to the actuator 1. As an electrical signal input, it is possible to apply a constant value or a liner sweep, or to adopt an arbitrary waveform, such as a rectangular wave, a sine wave or a pulse wave. In addition, the signal reference or a signal amplitude may be made controllable. Furthermore, the duration of signal input and the duty cycle of a signal waveform may be set arbitrarily.

An internal sensor for acquiring information on the displacement and position of the actuator 1 may be provided separately. In addition, the actuator 1 may include such a control mechanism as to change an input signal to the actuator 1 as appropriate, according to the detected value of the internal sensor.

Furthermore, the actuator 1 may be provided with an external sensor for detecting a distance from a target object and a state of contact therewith, separately from the abovementioned internal sensor. In addition, the actuator 1 may include such a control mechanism as to change an input signal to the actuator 1 as appropriate, according to the detected value of the external sensor.

By means of control using these sensors, the motion controllability of the actuator 1 can be enhanced further. If an ionic liquid is used, deterioration caused by electrolysis can be suppressed by applying a voltage to the extent of not exceeding the potential window of the ionic liquid. If a common ionic liquid is used, the voltage to be applied is more preferably 4 V or lower. If a fiber-like film in which polymer fibers are aligned in the electrolyte layer and the electrode layer so as to be uniaxially oriented is used as in the present invention, at least structural voids arise among the polymer fibers. Consequently, the percentage of voids in the electrolyte layer can be increased further, compared with a conventional filmy electrolyte. Since these voids facilitate the migration and diffusion of ions, the efficiency of ion migration within the electrolyte layer can be enhanced. Consequently, actuator characteristics can also be improved.

In addition, the mechanical strength against bending can be increased or decreased according to the orientation direction, the fiber diameter, and the filled amount of these polymer fibers. By means of such design for mechanical strength as described above, it is possible to provide a structure in which the displacement or generative force of the actuator can be derived to a higher degree.

Example 1

Hereinafter, respective embodiments for various aspects of the present invention will be described in further detail. It should be noted, however, that the present invention is not limited to these embodiments.

Filmy Electrode Layers/Polymer Fiber Electrolyte Layer Oriented in Longitudinal Direction An actuator 1 in the present embodiment is configured so that as illustrated in FIG. 1, an electrolyte layer 2 is formed of polymer fibers 10 and each electrode layer 3 is formed of a filmy membrane. In addition, the actuator 1 is configured so that the polymer fibers 10 of the electrolyte layer 2 are oriented in the longitudinal direction of the actuator.

The actuator 1 includes the electrolyte layer 2 in which 1-butyl-3-methylimidazolium tetrafluoroborate ($BMIBF_4$) which is an ionic liquid is filled in a base material made of a polyvinylidene fluoride-hexafluoropropylene copolymer (PVdF (HFP)) and the electrode layer 3 in which carbon nanotubes are mixed into these substances of the electrolyte layer.

The electrolyte layer 2 was fabricated using the following procedure. 80 mg of PVdF (HFP) (made by Kanto Chemical Co., Inc.) which was the base material, 100 mg of BMIBF4 (made by Kanto Chemical Co., Inc.) which was the ionic liquid, and 2 ml of N,N-dimethylacetamide (DMAc) (made by KISHIDA CHEMICAL Co., Ltd.) which was an organic solvent were heat-mixed at 80° C.

The mixed solution was jetted using an electrospinning apparatus (made by MECC Co., Ltd.) to perform fiber spinning. At this time, a voltage of 25 kV was applied to the spinning nozzle of the electrospinning apparatus. By taking up fibers for five hours with a rotary drum collector revolving at 1500 rpm, an electrolyte layer with a uniform orientation direction was formed as a film body made of one layer.

Observation of the obtained polymer fibers by using a scanning electron microscope (S-4800 made by Hitachi High-Technologies Corporation) proved that polymer fibers each having an approximately 1 µm diameter were uniaxially oriented. Calculation of the degree of orientation by using an image processing software resulted in a value of approximately 85%.

The electrode layer 3 was fabricated using the following procedure. 50 mg of single-wall carbon nanotubes (SWNT trade-named "HiPco" and made by Carbon Nanotechnologies Incorporated) which was an electroconductive material, 100 mg of the ionic liquid (BMIBF4), and 1 ml of the organic solvent (DMAc) were put in a container.

Zirconia balls having a particle diameter of 2 mm were added to a level of one-third the volume of the container, and a dispersion treatment was performed under the condition of 200 rpm/30 min by using a ball milling machine (a planetary ball mill made by Fritsch). Next, a solution prepared by heat-dissolving 80 mg of PVdF (HFP) which was a base material with 2 ml of DMAc was added. Then, a dispersion treatment was further performed under the condition of 500 rpm/30 min.

The mixed solution thus obtained was cast into a mold form made of PTFE and evenly flattened using a blade or the like. Then, the mixed solution was dried at room temperature, thereby obtaining the electrode layer 3 which was uniform in thickness and in which the electroconductive material was uniformly dispersed. The electrolyte layer 2 was cut so as to be 4 mm in width and 14 mm in length, with the orientation direction of polymer fibers agreeing with the longitudinal direction of the electrolyte layer. In addition, the electrode layer 3 was cut so as to be 2 mm in width and 12 mm in length. With the electrode layer 3 disposed on both surfaces of the electrolyte layer 2, the actuator being fabricated was thermocompression-bonded under the condition of 130° C./0.5 kN/1 min, thereby obtaining a pressure-bonded object. After the thermocompression bonding, the pressure-bonded object was soaked in the ionic liquid ($BMIBF_4$) for one hour. Thereafter, the pressure-bonded object was vacuum-dried for approximately 12 hours. Finally, the electrolyte layer 2 was trimmed by cutting off protruded portions thereof to obtain an actuator. Note that the same width and length as those of the actuator thus obtained were applied to embodiments and a comparative example to be described hereinafter.

The thickness of the obtained actuator 1 was approximately 75 µm (the electrolyte layer was 15 µm-thick and each electrode layer was 30 µm-thick).

Example 2

Filmy Electrode Layers/Polymer Fiber Electrolyte Layer Oriented in Transverse Direction An actuator 1 of the present embodiment is configured so that an electrolyte layer 2 is formed of polymer fibers 10 and an electrode layer 3 is formed of a filmy membrane. The actuator was obtained in the same way as in Example 1, except that the polymer fibers 10 of the electrolyte layer 2 were oriented in the transverse direction of the actuator.

Example 3

Figure 5:
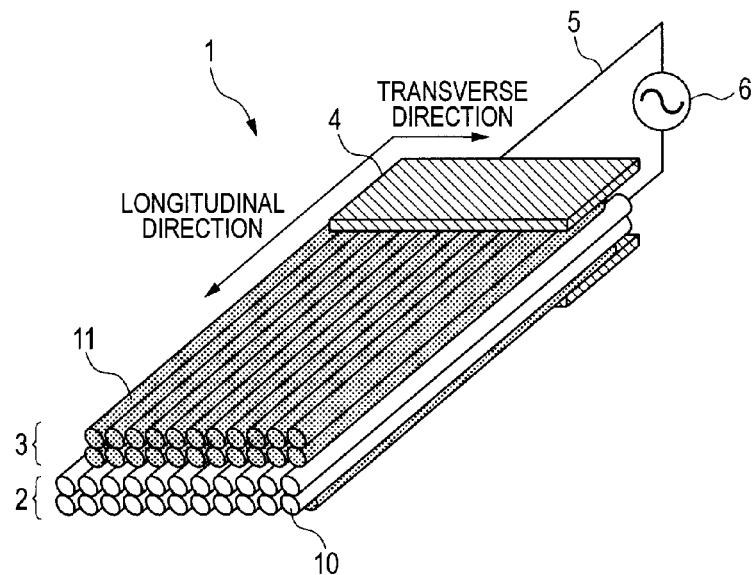
FIG. 5 is an illustration to describe the configuration of an actuator of Example 3 of the present invention.

Polymer Fiber Electrode Layers Oriented in Longitudinal Direction/Polymer Fiber Electrolyte Layer Oriented in Longitudinal Direction An actuator 1 of the present embodiment is configured so that as illustrated in FIG. 5, an electrolyte layer 2 is formed of polymer fibers 10 and an electrode layer 3 is also formed of polymer fibers 11. Both the polymer fibers 10 of the electrolyte layer 2 and the polymer fibers 11 of the electrode layer 3 are oriented in the longitudinal direction of the actuator.

The present embodiment is the same as Example 1, except the electrode layers 3. The polymer fibers 11 of each electrode layer 3 were fabricated using the following procedure. First, an electroconductive-material-dispersed body in which an electroconductive material was uniformly dispersed was fabricated in the following way. 30 mg of single-wall carbon nanotubes (SWNT) serving as the electroconductive material, 80 mg of an ionic liquid (BMIBF4), and 1 ml of an organic solvent (DMAc) were put in the same container. Then, dispersion with a ball milling machine was performed under the condition of 200 rpm/30 min by using zirconia balls (2 mm in particle diameter).

Next, a solution prepared by heat-dissolving 80 mg of PVdF (HFP) which was a base material with 2 ml of DMAc was added. Then, a dispersion treatment was further performed under the condition of 500 rpm/30 min. The DMAc was added to dilute the dispersed body obtained as described above, thereby obtaining the electroconductive-material-dispersed body in which the electroconductive material was uniformly dispersed.

Next, the solution of the electroconductive-material-dispersed body was jetted using an electrospinning apparatus to perform fiber spinning. At this time, a voltage of 25 kV was applied to the spinning nozzle of the electrospinning apparatus. By taking up fibers for five hours with a rotary drum collector revolving at 1500 rpm, an electrode layer with a uniform orientation direction was formed as a film body made of one layer.

Observation of the obtained polymer fibers by using a scanning electron microscope (S-4800 made by Hitachi High-Technologies Corporation) proved that polymer fibers each having an approximately 1 µm diameter were uniaxially oriented. Calculation of the degree of orientation by using an image processing software resulted in a value of approximately 85%.

The electrolyte layer 2 and the electrode layers 3 were cut so that the orientation direction of polymer fibers agreed with the longitudinal direction. Then these layers were thermocompression-bonded, thereby obtaining a pressure-bonded object. After the thermocompression bonding, the pressure-bonded object was soaked in the ionic liquid (BMIBF4) for one hour. Thereafter, the pressure-bonded object was vacuum-dried for approximately 12 hours.

The thickness of the obtained actuator 1 was adjusted so as to be approximately 75 μm (the electrolyte layer was 15 μm-thick and each electrode layer was 30 μm-thick).

Example 4

Figure 6:
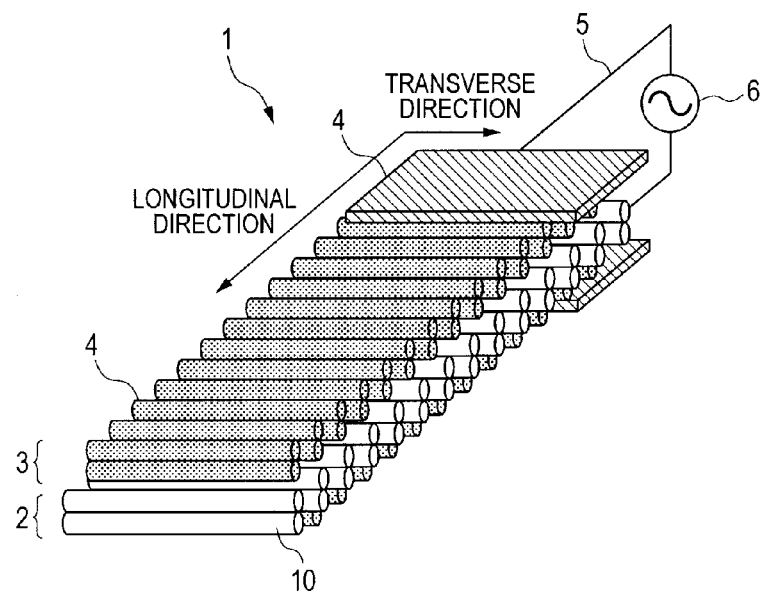
FIG. 6 is an illustration to describe the configuration of an actuator of Example 4 of the present invention.

Polymer Fiber Electrode Layers Oriented in Transverse Direction/Polymer Fiber Electrolyte Layer Oriented in Transverse Direction An actuator 1 of the present embodiment is configured so that an electrolyte layer 2 is formed of polymer fibers 10 and an electrode layer 3 is also formed of polymer fibers 11. Both the polymer fibers 10 of the electrolyte layer 2 and the polymer fibers 11 of the electrode layer 3 are oriented in the transverse direction of the actuator, as illustrated in FIG. 6. The rest of the configuration is the same as that of Example 3.

Comparative Example 1

Filmy Electrode Layers/Filmy Electrolyte Layer

An actuator of the present comparative example is configured so that an electrolyte layer 2 is formed of a filmy membrane and an electrode layer 3 is also formed of a filmy membrane.

The present comparative example is the same as Example 1, except the electrolyte layer 2. The electrolyte layer 2 was fabricated using the following procedure. 100 mg of PVdF (HFP) which was the base material, 100 mg of an ionic liquid (BMIBF4), and 1 ml of an organic solvent (DMAc) were heat-mixed at 80° C. The mixed solution thus obtained was cast into a mold form made of PTFE and evenly flattened using a blade or the like. Then, the mixed solution was dried at room temperature, thereby obtaining the electrolyte layer 2 uniform in thickness.

The electrolyte layer 2 and the electrode layers 3 were cut and thermocompression-bonded, thereby obtaining a pressure-bonded object. After the thermocompression bonding, the pressure-bonded object was soaked in the ionic liquid (BMIBF4) for one hour. Thereafter, the pressure-bonded object was vacuum-dried for approximately 12 hours, thereby obtaining the actuator.

The thickness of the obtained actuator 1 was adjusted so as to be approximately 75 μm (the electrolyte layer was 15 μm-thick and each electrode layer was 30 μm-thick).

Driving of Actuator

Each actuator was driven in the following way. An external power supply 6 was comprised of an arbitrary waveform generator (33220A made by Agilent) and a current/voltage amplifier (HSA4014 made by NF Corporation). A voltage signal generated by the arbitrary waveform generator was amplified by the current/voltage amplifier and applied to the actuator. The voltage signal was rectangular in voltage waveform, and an AC voltage was applied with the reference voltage thereof set to 0 V, the amplitude thereof set to ±2.5 V, and the frequency thereof set to 0.1 Hz.

Displacement Evaluation

The displacement of each actuator in bending motion was evaluated using a laser displacement gauge (LK-G80 made by Keyence Corporation).

A 2 mm portion from the long-side end (fixed end) of a 2 mm-wide and 12 mm-long actuator was sandwiched by extraction electrodes 4. A voltage of ±2.5 V was applied to the actuator in the air to bring the actuator into bending motion. The amount of displacement at that time at a position 8 mm away from the fixed end was measured with a laser displacement gauge.

Table 1 summarizes the results of measuring the displacements of actuators fabricated in Examples 1 to 4 and Comparative Example 1. In Table 1, the results of Comparative Example 1 are used as references (each being '1' in numerical value), and values relative to the reference values of Comparative Example 1 are shown for Examples 1 to 4.

Generative Force Evaluation

The generative force of each actuator in bending motion was evaluated using a load cell for microforce evaluation (UL-10GR made by Minebea Co., Ltd.).

A 2 mm portion from the long-side end (fixed end) of a 2 mm-wide and 12 mm-long actuator was sandwiched by extraction electrodes 4. A voltage of ±2.5 V was applied to the actuator in the air to bring the actuator into bending motion. The amount of generative force at that time at a position 2 mm away from the fixed end of the actuator was measured with the load cell.

Table 1 summarizes the results of measuring the generative forces of actuators fabricated in Examples 1 to 4 and Comparative Example 1. In Table 1, the results of Comparative Example 1 are used as references (each being '1' in numerical value), and values relative to the reference values of Comparative Example 1 are shown for Examples 1 to 4.

TABLE 1

| | Example 1 | Example 2 | Example 3 | Example 4 | Comparative Example 1 |
| --- | --- | --- | --- | --- | --- |
| Electrolyte layer | Polymer fibers (Oriented in Longitudinal direction) | Polymer fibers (Oriented in transverse direction) | Polymer fibers (Oriented in Longitudinal direction) | Polymer fibers (Oriented in transverse direction) | Film |
| Electrode layer | Film | Film | Polymer fibers (Oriented in longitudinal direction) | Polymer fibers (Oriented in Transverse direction) | Film |
| Displacement | 1.05 | 1.28 | 1.02 | 1.58 | 1 |
| Generative force | 1.4 | 0.96 | 1.57 | 0.92 | 1 |

As is understood from the results shown in Table 1, it was possible to further improve the amount of displacement or generative force by using polymer fibers for an electrolyte layer in actuators having almost the same width, length and thickness. Specifically, it was possible to enhance mechanical strength against bending and increase the amount of generative force by orienting polymer fibers in the longitudinal direction of each actuator. Alternatively, it was possible to reduce mechanical strength against bending and increase the amount of displacement by orienting the polymer fibers in the transverse direction of each actuator.

In addition, it is possible to further increase the amount of displacement or generative force by using polymer fibers for each electrode layer and aligning the orientation direction of the polymer fibers with that of the polymer fibers of the electrolyte layer.

INDUSTRIAL APPLICABILITY

An actuator of the present invention is able to increase the amount of displacement or generative force in action in the air. Accordingly, the actuator can be utilized as an actuator of a robot which is configured to work with humans and therefore needs to be flexible and safe, a hand or a manipulator for robots, and a driving source of various types of machinery. The actuator can also be utilized for a medical/welfare robot, such as a surgical device or an assist suit, as well as for micromachines or the like.

The present invention is not limited to the above embodiments and various changes and modifications can be made within the spirit and scope of the present invention. Therefore to apprise the public of the scope of the present invention, the following claims are made.

This application claims the benefit of Japanese Patent Application No. 2009-278886, filed Dec. 8, 2009, which is hereby incorporated by reference herein in its entirety.

The invention claimed is:

1. An actuator comprising a pair of electrode layers and an electrolyte-containing electrolyte layer interposed between the pair of electrode layers, the actuator transforming upon application of a voltage thereto to cause ions in the electrolyte to migrate, wherein the electrolyte layer includes at least one polymer fiber layer made of polymer fibers and at least some of the polymer fibers of the polymer fiber layer are uniaxially oriented within a plane of the electrolyte layer.

2. The actuator according to claim 1, wherein either one of the pair of electrode layers includes at least one polymer fiber layer made of an electroconductive material and polymer fibers, and at least some of the polymer fibers of the electrode layer are uniaxially oriented within a plane of the electrode layer.

3. The actuator according to claim 2, wherein both of the directions in which the polymer fibers of the electrolyte layer and the polymer fibers of the electrode layer are uniaxially oriented are the longitudinal direction of the actuator.

4. The actuator according to claim 2, wherein both of the directions in which the polymer fibers of the electrolyte layer and the polymer fibers of the electrode layer are uniaxially oriented are the transverse direction of the actuator.

* * * * *